United States Patent [19]

Newkirk et al.

[11] Patent Number: 5,024,794
[45] Date of Patent: * Jun. 18, 1991

[54] SELF-SUPPORTING CERAMIC STRUCTURES AND METHODS OF MAKING THE SAME

[75] Inventors: Marc S. Newkirk; Jerry G. Weinstein, both of Newark, Del.

[73] Assignee: Lanxide Technology Company, LP, Newark, Del.

[*] Notice: The portion of the term of this patent subsequent to May 2, 2006 has been disclaimed.

[21] Appl. No.: 168,301

[22] Filed: Mar. 15, 1988

Related U.S. Application Data

[63] Continuation-in-part of Ser. No. 212,072, Jun. 24, 1988, Pat. No. 4,826,643, which is a continuation-in-part of Ser. No. 907,923, Sep. 16, 1986, abandoned.

[51] Int. Cl.⁵ .............................................. C04B 35/60
[52] U.S. Cl. .................................... 264/57; 264/60; 264/82
[58] Field of Search ................ 264/57, 59, 60, 65, 264/82; 501/98, 127, 128

[56] References Cited

U.S. PATENT DOCUMENTS

| | | | |
|---|---|---|---|
| 2,741,822 | 4/1956 | Udy | 264/59 |
| 3,255,027 | 9/1962 | Talsma | 106/65 |
| 3,296,002 | 1/1967 | Hare | 106/10 |
| 3,298,842 | 1/1967 | Seufert | 106/65 |
| 3,419,404 | 12/1968 | Mao | 106/65 |
| 3,421,863 | 1/1969 | Bawa | 29/182.5 |
| 3,437,468 | 4/1969 | Seufert | 51/298 |
| 3,473,938 | 4/1968 | Oberlin | 106/57 |
| 3,473,987 | 10/1969 | Sowards | 156/89 |
| 3,538,231 | 11/1970 | Newkirk et al. | |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,826,643 | 5/1989 | Newkirk et al. | 264/57 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |
| 0193292 | 9/1986 | European Pat. Off. |

OTHER PUBLICATIONS

"Oxidation of Molten Aluminum Alloys, Reaction with Refractories"—M. Drouzy and M. Richard—Mar., 1974—Fonderie, France No. 332, pp. 121–128.

"Refractories for Aluminum Alloy Melting Furnaces'—'—B. Clavaud and V. Jost—Sep., 1980—Lillian Brassinga (from French) Jan. 1985.

Primary Examiner—James Derrington
Attorney, Agent, or Firm—Mark G. Mortenson; Michael K. Boyer; William E. McShane

[57] ABSTRACT

A method of producing a self-supporting ceramic or ceramic composite structures which includes providing a first self-supporting ceramic or ceramic composite body comprising (i) a polycrystalline oxidation reaction product formed upon oxidation of a first molten parent metal with a first oxidant, and (ii) interconnected porosity at least partially accessible from one or more surfaces of said first ceramic body. A second ceramic body is used to form, by reaction with an oxidant, a second polycrystalline material which is infiltrated into the porosity of at least a portion of said first ceramic body.

21 Claims, 5 Drawing Sheets

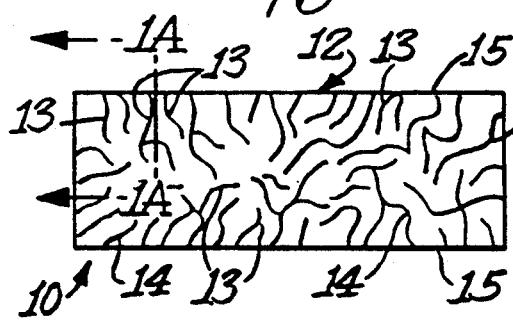
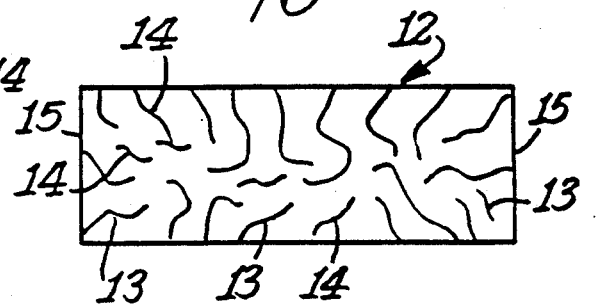
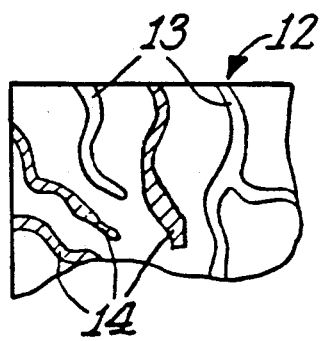
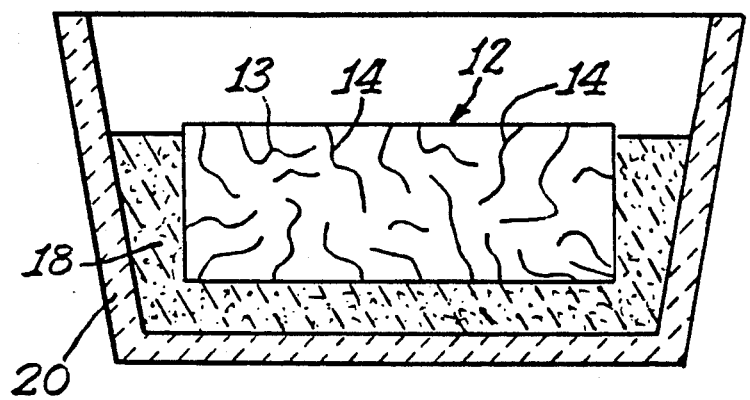
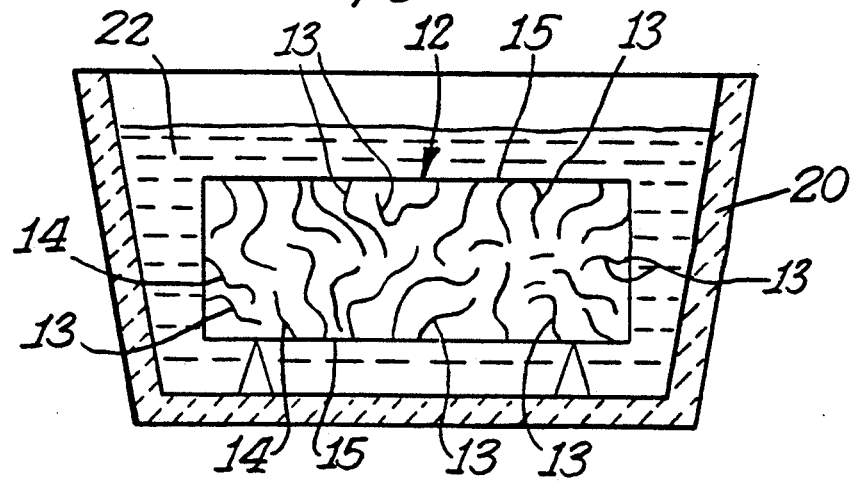

SELF-SUPPORTING CERAMIC STRUCTURES AND METHODS OF MAKING THE SAME

CROSS-REFERENCE TO RELATED APPLICATION

This application is a continuation-in-part of commonly owned and copending U.S. patent application Ser. No. 212,072, filed June 24, 1988, now U.S. Pat. No. 4,826,643, which is a continuation-in-part of U.S. patent application Ser. No. 907,923, filed Sept. 16, 1986, now abandoned, in the name of Marc S. Newkirk et al, and entitled "Self-Supporting Ceramic Structures and Methods of Making the Same".

FIELD OF THE INVENTION

The present invention relates generally to a method of modifying a self-supporting first ceramic or ceramic composite body comprised of a first polycrystalline material having interconnected porosity by incorporating a second polycrystalline material into at least some of the porosity of the first ceramic body. More particularly, this invention relates to self-supporting ceramic and ceramic composite structures formed as the oxidation reaction product of first and second parent metals. The invention also relates to methods for producing such ceramic and ceramic composite structures.

DESCRIPTION OF COMMONLY OWNED PATENT APPLICATIONS AND RELATED ART

The subject matter of this application is related to copending and commonly owned U.S. Pat. No. 4,713,360, which issued on Dec. 15,1987 based on U.S. application Ser. No. 818,943, filed Jan. 15, 1986, which is a continuation-in-part of Ser. No. 776,964, filed Sept. 17, 1985, which is a continuation-in-part of Ser. No. 705,787, filed Feb. 26, 1985, which is a continuation-in-part of U.S. Ser. No. 591,392, filed Mar. 16, 1984, all in the name of Marc S. Newkirk et al. and entitled "Novel Ceramic Materials and Methods for Making the Same." This patent discloses the method of producing self-supporting ceramic bodies grown as the oxidation reaction product from a parent metal precursor. Molten parent metal is reacted with a vapor-phase oxidant to form an oxidation reaction product, and the metal migrates through the oxidation product toward the oxidant thereby continuously developing a polycrystalline ceramic body which can be produced having an interconnected, metallic component and/or interconnected porosity. The process may be enhanced by the use of an alloyed dopant, such as in the case of an aluminum parent metal oxidized in air. This method was improved by the use of external dopants applied to the surface of the precursor metal as disclosed in commonly owned and copending U.S. patent application Ser. No. 822,999, filed Jan. 27, 1986, which is a continuation-in-part of Ser. No. 776,965 filed Sept. 17, 1985, which is a continuation-in-part of Ser. No. 747,788 filed June 25, 1985, which is a continuation-in-part of Ser. No. 632,636, filed July 20, 1984, all in the name of Marc S. Newkirk et al. and entitled "Methods of Making Self-Supporting Ceramic Materials".

The subject matter of this application is also related to that of commonly owned and copending U.S. patent application Ser. No. 819,397, filed Jan. 17, 1986, now U.S. Pat. No. 4,851,375 which is a continuation-in-part of Ser. No. 697,876, filed Feb. 4, 1985, both in the name of Marc S. Newkirk et al. and entitled "Composite Ceramic Articles and Methods of Making Same". These applications disclose a novel method for producing self-supporting ceramic composites by growing an oxidation reaction product from a parent metal into a permeable mass of filler, thereby infiltrating the filler with a ceramic matrix.

The entire disclosure of all of the foregoing commonly owned patent applications and patent are expressly incorporated herein by reference.

Common to each of these commonly owned patent applications and patent is the disclosure of embodiments of a ceramic body comprising an oxidation reaction product and, optionally, one or more nonoxidized constituents of the parent metal precursor, or voids, or both. The oxidation reaction product may exhibit interconnected porosity which may be a partial or nearly complete replacement of the metal phase. The interconnected porosity will largely depend on such factors as the temperature at which the oxidation reaction product is formed, the length of time at with the oxidation reaction product is formed, the length of time at which the oxidation reaction is allowed to proceed, the composition of the parent metal, the presence of dopant materials, etc. Some of interconnected porosity is accessible from an external surface or surfaces of the ceramic body, or is rendered accessible by a post-process operation as by machining, cutting, grinding, fracturing, etc.

SUMMARY OF THE INVENTION

In accordance with the present invention there is provided a method of producing a self-supporting ceramic structure, the method comprising the following steps. A first, self-supporting ceramic body is provided. This first ceramic body comprises a first polycrystalline oxidation reaction product formed upon oxidation of a first molten parent metal with a first oxidant, and interconnected porosity at least partially accessible from one or more surfaces of the ceramic body. A body of second parent metal and the first ceramic body are oriented relative to each other so that melting and oxidation reaction of the second parent metal with a second, vapor-phase oxidant will cause formation of a second polycrystalline oxidation reaction product in a direction towards and into the interconnected porosity of the first ceramic body.

While a vapor-phase oxidant is discussed primarily herein as the oxidant for the body of second metal, it should be understood that any suitable oxidant including solid or liquid oxidants, or combination of oxidants which can be disposed within the porosity of the first ceramic body may be used in the practice of this invention. Thus, the term "vapor-phase oxidant" used throughout the specification of this application should not be interpreted as limiting the type of oxidant which can be used to form the second polycrystalline oxidation reaction product.

The second parent metal is heated to a temperature region above its melting point but below the melting points of both the first and second oxidation reaction products to form a body of molten second parent metal. Within that temperature region the body of molten second parent metal is reacted with the vapor-phase oxidant to form the second oxidation reaction product is maintained in contact with and between the body of molten second parent metal and the oxidant, whereby second parent metal is drawn through the second polycrystalline material towards the oxidant so that second oxidation reaction product continues to form at the interface between the oxidant and previously formed second oxidation reaction product. Finally, the reaction is continued within the aforesaid temperature region for a time sufficient to infiltrate at least part of the porosity of the ceramic body with the second polycrystalline material.

One aspect of the invention includes making the first ceramic body by the following steps. A first parent metal is heated to form a body of molten parent metal which is reacted with a first oxidant at a temperature to form a first oxidation reaction product. The first oxidation reaction product is maintained in contact with, and extending between, the body of first molten parent metal and the oxidant, and the temperature is maintained to progressively draw molten metal through the first oxidation reaction product towards the oxidant so that the first oxidation reaction product continues to form at the interface between the oxidant and previously formed first oxidation reaction product. The reaction is continued in the process temperature range for a time sufficient to produce a first, self-supporting ceramic body comprised of a polycrystalline material comprising the first oxidation reaction product and having one or both of porosity and one or more metallic constituents. The improvement in this method comprises the following steps: (1) a selected degree of porosity is provided to the first polycrystalline material, either by suitably controlling the above-described conditions of making it, or by post-treatment (or both). After step (1), a second parent metal and the first polycrystalline material are oriented relative to each other so that formation of a second polycrystalline oxidation reaction product will occur in a direction towards and into the porosity of the first polycrystalline material. Then, the above-described steps to make the first ceramic body are repeated on the second parent metal and first polycrystalline material with a second, vapor-phase oxidant. This results in the formation of a second oxidation reaction product which is continued for a time sufficient so that the second oxidation reaction product infiltrates at least a portion of the porosity of the first polycrystalline material, thereby forming the ceramic structure.

In accordance with the present invention there is also provided a self-supporting ceramic structure which comprises the following. A first ceramic body comprised of a first polycrystalline oxidation reaction product formed upon oxidation of a first molten parent metal with an oxidant, and possessing interconnected porosity at least partially accessible from one or more surfaces of said ceramic body; and a second polycrystalline oxidation reaction product formed upon oxidation of a second molten parent metal with an oxidant, disposed in at least a portion of the aforesaid porosity.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents and/or porosity (interconnected and isolate) most typically within a range of from about 1–40% by volume, but the amount of metallic constituents may be higher.

"Oxidation reaction product" means one or more metals in any oxidized state wherein the metal have given up electrons to or shared electrons with another element, compound, or combination thereof. Accordingly, an "oxidation reaction product" under this definition includes the product of reaction of one or more metals with an oxidant such as those described herein.

"Oxidant" means one or more suitable electron acceptors or electron sharers and may be a solid, a liquid or a gas (vapor) or some combination of these (e.g., a solid and a gas) at the process conditions for ceramic growth.

"Parent metal" is intended to refer to relatively pure metals, commercially available metals with impurities and/or alloying constituents therein, and alloys and intermetallic compounds of the metals. When a specific metal is mentioned, the metal identified should be read with this definition in mind unless indicated otherwise by the context. For example, when aluminum is the parent metal, the aluminum may be relatively pure metal (e.g., commercially available aluminum of 99.7% purity), or 1100 aluminum having as nominal impurities of about 1% by weight silicon plus iron, or aluminum alloys such as, for example 5052.

BRIEF DESCRIPTION OF FIGURES

FIG. 1 is a schematic view of a ceramic body having interconnected porosity and interconnected metal.

FIG. 1A is an enlarged view taken along lines A—A of FIG. 1.

FIG. 2 is a schematic, partially cross-sectional view of the ceramic body of FIG. 1 after a substantial part of the interconnected metal has been removed.

FIG. 3 is a schematic view of a ceramic body in an inert bed contained within a crucible which is to be inserted into a furnace to vaporize the interconnected metal.

FIG. 4 is a schematic view of a ceramic body immersed in a solvent leachant in order to remove the interconnected metal.

DETAILED DESCRIPTION OF THE INVENTION AND THE PREFERRED EMBODIMENTS

Figure 5:
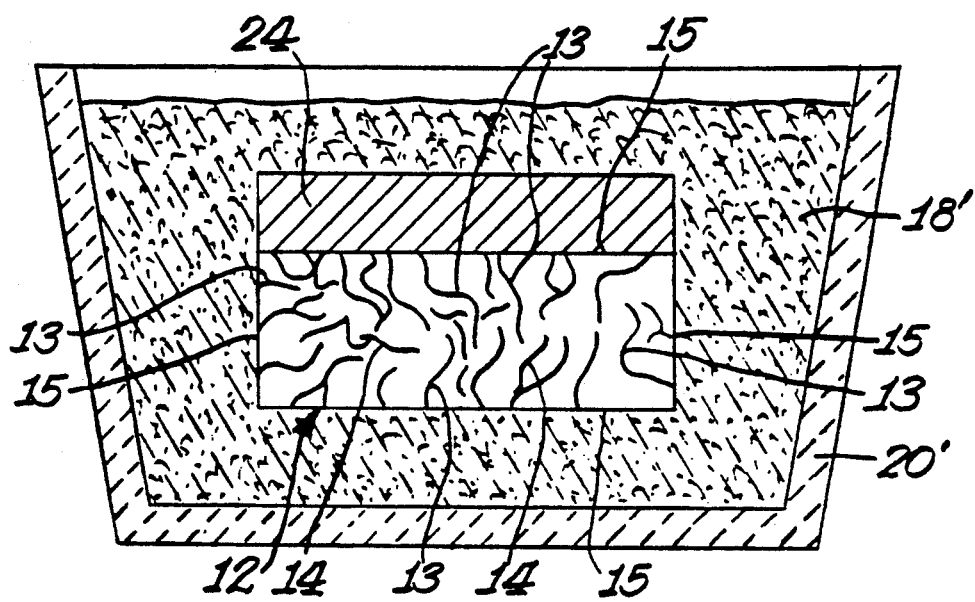
FIG. 5 is a schematic view of an assembly of a first ceramic body having a second parent metal placed thereon with the assembly retained in an inert bed contained in a refractory vessel.

In accordance with the method of this invention, a first self-supporting ceramic body is produced with interconnected porosity. The interconnected porosity is at least partially open or accessible from an external surface (or surfaces), or is rendered accessible by post-process treatment. A significant or substantial amount of the interconnected porosity is filled, infiltrated, or the like, with a second polycrystalline material which becomes integral with the product ceramic structure, thereby modifying, improving or contributing to certain properties of the first ceramic body. Although the invention is described below with particular reference to aluminum as both the first and second parent metals, it should be understood that other parent metals are also applicable, such as silicon, titanium, tin, zirconium, and hafnium.

Referring to FIG. 1, a self-supporting first polycrystalline ceramic body 12 is first provided, which is made, for example, by the methods of any of the above referred to commonly owned patent and patent applications. Accordingly, a first parent metal, e.g. aluminum, which may be doped (as explained below in greater detail) is provided as the precursor to the first oxidation reaction product. The first parent metal is melted within an appropriate temperature range in or immediately adjacent to a first oxidizing environment. At this temperature, or within this temperature range, the molten first parent metal reacts with the oxidant to form a first polycrystalline oxidation reaction product. At least a portion of the first oxidation reaction product is maintained in contact with and between the molten first parent metal and the first oxidant to draw molten first parent metal through the first oxidation reaction product and into contact with the first oxidant. In this manner, the first oxidation reaction product continues to form at the interface between the first oxidant and previously formed first oxidation reaction product. The reaction is continued for a time sufficient to form the first polycrystalline ceramic body 12 comprising or consisting essentially of the first oxidation reaction product, generally illustrated as 10, having an interconnected porosity 13, and/or an interconnected metallic constituent 14 (FIG. 1A). Interconnected metallic constituent 14, below sometimes referred to simply as metal or metal component 14, comprises nonoxidized constituents of the parent metal and may include dopants and other metal inclusions. The interconnected porosity 13, as well as the interconnected metallic constituent 14, are interconnected in one or more dimensions and are dispersed or distributed through part or substantially all of the first polycrystalline oxidation reaction product, are both at least partially open or accessible from at least one surface, as at surfaces 15, of the first ceramic body 12, or may be rendered accessible as by machining or fracturing. Some of the porosity 13 and the metal 14 may be isolated as islands. The volume percents of porosity 13 (interconnected and isolated) and metallic constituent 14 (interconnected and isolated) will depend largely on such conditions as temperature, time, dopants, and type of first parent metal employed in making the first ceramic body 12.

In a preferred embodiment of the invention, essentially or substantially all of the interconnected metal 14 is or can be removed to produce a first self-supporting ceramic body 12 having interconnected porosity 13 distributed through part or substantially all of the polycrystalline material, as illustrated in FIG. 2. In order to remove all or a substantial part of the interconnected metal 14, the oxidation reaction process may be taken to completion; that is, when the metal phase has been completely reacted or nearly completely reacted to form oxidation reaction product, the interconnected metal component 14 is drawn from the ceramic body 12, leaving interconnected porosity 13 in its place, and is oxidized to form additional ceramic on its surface(s) 15. If the process is taken to completion, the oxidation reaction product will exhibit a higher volume percent of porosity 13 which is at least partially interconnected. For example, a first ceramic body formed from aluminum processed in air at about 1125° C. may contain from about 20 volume percent to about 30 volume percent metal 14, and from about 2 volume percent to about 5 volume percent porosity 13 when growth is stopped before all the first parent metal is oxidized; and if processed to complete the oxidation of all the first parent metal, it may contain from about 1 volume percent to about 3 volume percent metallic constituents 14, and from about 25 volume percent to about 30 volume percent (or higher) voids or pores (porosity) when the process is run to completion.

A second method or means of removing interconnected metal 14 is to place the first ceramic body in an inert bed 18 that is contained within a crucible or other refractory container 20 (see FIG. 3). The container 20 and its contents are then placed into a furnace having an inert atmosphere (e.g. argon or any other non-reactive gas) and heated to temperatures where the metallic constituent 14 will have a high vapor pressure. This temperature or preferred range can vary depending upon such factors as the composition of the first parent metal, the time of heating and the end composition of the metallic constituent 14 in the first ceramic body. At the suitable temperatures, interconnected metal 14 will vaporize from the ceramic body but no additional oxidation reaction product will form because of the inert atmosphere. By maintaining these temperatures, the interconnected metal 14 will continue to vaporize and be carried away from the furnace as by a suitable venting means within the furnace.

A third method or means of removing interconnected metal 14 is to or immerse the first ceramic body 12 into a suitable leachant 22 to dissolve or disperse out the interconnected metal 14 (see FIG. 4). The leachant 22 may be any acidic or caustic liquid or gas, which will depend upon such factors as the composition of metal 14, the time of immersion, etc. In the case of using aluminum as the first parent metal, and therefore having aluminum in the interconnected metal 14, HCl has been found to be a suitable acidic medium. In a preferred embodiment of the present invention, a gas phase mixture of HCl and $H_2$ at temperatures ranging from 375°–1000° C. is used as the leachant. This gas phase leaching provides greater removal of interconnected metal in less time than the liquid phase HCl counterpart. If the ceramic body contains silicon, NaOH and/or KOH solution are an acceptable caustic medium. The time of immersion of the ceramic body in the leachant 22 will depend upon the amount and type of the metal component 14, and where the interconnected metal 14 is situated with respect to the surface(s) 15. The deeper the interconnected metal 14 is in the first ceramic body 12 the longer it will take such metal 14 to be leached or etched-out, and the longer the ceramic body will have to left in the leachant 22. This extraction step may be facilitated by heating the leachant or by agitating the bath of leachant. After the first ceramic body 12 has been removed from the leachant 22, it should be washed with water to remove any residual leachant.

When essentially or substantially all of the interconnected metal 14 has been removed, a self-supporting first ceramic body 12 is produced which comprises a polycrystalline oxidation reaction product formed upon oxidation of a molten parent metal precursor with an oxidant and having interconnected porosity 13, which preferably comprises from about 5 volume percent to about 45 volume percent of the first ceramic body 12.

A second polycrystalline material is formed from a second parent metal by oxidation thereof with a second, vapor-phase oxidant in a process similar or identical to that used to make the first ceramic body, with the second parent metal and first ceramic body oriented with respect to each other so that the forming second polycrystalline material infiltrates at least some of the porosity of the first ceramic body. The infiltration may be limited to a first zone of the first ceramic body or it may be extended through substantially the entire volume of the first ceramic body. Where the infiltration by the second polycrystalline material is limited to a first zone of the first ceramic body, the second, uninfiltrated zone of the first ceramic body will have its porosity substantially unaffected by the infiltration by the second polycrystalline material. The second, uninfiltrated zone may thus have greater porosity than the first infiltrated zone of the product ceramic structure.

Another technique is to remove metal constituent 14 from only a first zone of the first ceramic body 12, or to remove more useful constituent from the first zone than from the second zone of first ceramic body 12. This may readily be accomplished, for example, by immersing only a part of first ceramic body 12 into the leachant 22 (FIG. 4).

The second polycrystalline material is formed by the techniques disclosed in the commonly owned patent and patent applications, and one such method is exemplified in FIG. 5 in which the first ceramic body 12, having a high or increased (by post-process) porosity 13, and a correspondingly reduced metallic constituents 14 is emplaced within an inert bed 18' contained within a refractory container 20'. A body of second parent metal 24 is placed atop the first ceramic body 12. Porosity 13 extends to the surface 15 of first ceramic body 12. The assembly shown in FIG. 5 is heated to the desired reaction temperature, which is above the melting point of second parent metal body 24 but below that of both the first oxidation reaction product of first ceramic body 12 and the second oxidation reaction product of second parent metal 24. This assembly is heated in an oxidizing environment, e.g., an air atmosphere, and growth of the second polycrystalline material commences into the porosity 13 of first ceramic body 12. The growth is continued to fill the porosity to a desired extent, e.g., through substantially all of first ceramic body 24 or to a desired extent therein. After the reacting is completed, the assembly is cooled and the resultant ceramic composite structure is separated from the filler 18' and residual second parent metal 24, if any.

As explained above, the first ceramic body is produced from a suitable first parent metal according to the processes disclosed in the commonly owned patent applications. In one preferred embodiment of this invention, a composite is produced by utilizing a mass or bed of permeable filler material placed adjacent to and in contact with a surface of the first parent metal, and the process is continued until the oxidation reaction has infiltrated the bed of filler material to its boundary, which can be defined by a suitable barrier means. The mass of filler, which preferably is shaped as a preform, is sufficiently porous or permeable to allow the oxidant, in the case of a vapor-phase oxidant, to permeate the filler and contact the first parent metal, and to accommodate growth of the first oxidation reaction product within the filler. Alternatively, the first oxidant may be contained within or comprise the filler. The filler may include any suitable material such as particulates, powders, platelets, hollow bodies, spheres, fibers, whiskers, etc., which typically are ceramic materials. Further, the bed of filler may include a lattice of reinforcing rods, plates, or wires. Typically in these polycrystalline ceramic structures, including ceramic composites, the oxidation reaction product crystallites are interconnected and the porosity and/or metallic component are at least partially interconnected and accessible from an external surface of the ceramic body.

In an alternative embodiment of the present invention, at least one filler material is disposed within the porosity of the first ceramic or ceramic composite body prior to the infiltration of the second polycrystalline oxidation reaction product. This filler material may be disposed within the porosity of the first ceramic or ceramic composite body by soaking the porous first body in a solution containing the filler material, or a precursor thereof, or by packing powdered or granulated filler material into the porosity, or by depositing the filler material by chemical vapor deposition, or by any other means which will dispose the filler material in at least a portion of the porosity of the first ceramic or ceramic composite body. Once the filler material is so disposed within the porosity of the first ceramic or ceramic composite body, the second polycrystalline oxidation reaction product may be grown into the porosity, thus infiltrating and embedding the filler material disposed within the porosity to produce a ceramic composite structure within the porosity of the first ceramic or ceramic composite body.

As explained in the commonly owned patent applications, dopant materials used in conjunction with one or more of the first and second parent metals can, in certain cases, favorably influence the oxidation reaction processes, particularly in systems employing aluminum as the parent metal. The function or functions of a dopant material can depend upon a number of factors other than the dopant material itself. Such factors include, for example, the particular combination of dopants when two or more dopants in combination with a dopant alloyed with the parent metal, the concentration of the dopant(s), the oxidizing environment, and the process conditions.

The dopant or dopants used in conjunction with the first and/or second parent metals (1) may be provided as alloying constituents of the parent metal, (2) may be applied to at least a portion of the surface of the parent metal, or, (3) when a filler is utilized, may be applied to or incorporated into part of all of the filler material or preform, or any combination of two or more techniques (1), (2) and (3) may be employed. For example, an alloyed dopant may be used solely or in combination with a second externally applied dopant. In the case of technique (3), where additional dopant or dopants are applied to the filler material, the application may be accomplished in any suitable manner as explained in the commonly owned patent applications.

Dopants useful for an aluminum parent metal, particularly with air as the oxidant, include magnesium, zinc, and silicon either alone or in combination with each other or in combination with other dopants, as described below. These metals, or a suitable source of the metals, may be alloyed into the aluminum-based parent metal at concentrations for each of between about 0.1–10% by weight based on the total weight of the resulting doped metal. These dopant materials or a suitable source thereof (e.g. MgO, ZnO, or $SiO_2$) may also be used externally to the parent metal. Thus, an alumina ceramic structure is achievable for an aluminum-silicon alloy as the parent metal using air as the oxidant by using MgO as a surface dopant in an amount greater than about 0.0008 gram per gram of parent metal to be oxidized or greater than 0.003 gram per square centimeter or parent metal upon which the MgO is applied.

Additional examples of dopant materials effective with aluminum parent metals oxidized with air include sodium, germanium, tin, lead, lithium, calcium, boron, phosphorus, and yttrium which may be used individually or in combination with one or more other dopants depending on the oxidant and process conditions. Rare earth elements such as cerium, lanthanum, praseodymium, neodymium, and samarium are also useful dopants, and herein again especially when used in combination with other dopants. All of the dopant materials as explained in the commonly owned patent and patent applications are effective in promoting polycrystalline oxidation reaction product growth for the aluminum-based parent metal systems.

A solid, liquid or vapor-phase (gas) oxidant, or a combination of such oxidants, may be employed with the first parent metal and the second parent metal. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed as described above, a vapor-phase oxidant, is preferred. However, it should be understood that two or more types of oxidants may be used in combination with the first metals. When the oxidant employed to oxidize the second parent metal is a vapor-phase oxidant, the first ceramic body, or at least the zone thereof which is to be infiltrated by the second polycrystalline material, is permeable or is rendered permeable by the post-processing. The vapor-phase oxidant permeates the first ceramic body or selected zone thereof and therein contacts the second parent metal to oxidize it and forms the second polycrystalline material within the porosity of the first ceramic body. If a vapor-phase oxidant is used in conjunction with the first parent metal and a filler, the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants when an oxide is desired oxidation reaction product, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions in the oxidizing environment utilized. For example, although the major constituent of air is nitrogen, the oxygen content of air is the sole oxidizer for the parent metal because oxygen is a significantly stronger oxidant than nitrogen. Air, therefore, falls within the definition of an "oxygen-containing gas" oxidant but not within the definition of a "nitrogen-containing gas" oxidant. As example of a "nitrogen-containing gas" oxidant as used herein and in the claims is "forming gas", which contains about 96 volume percent nitrogen and about 4 volume percent hydrogen.

When a solid oxidant is employed in conjunction with the first parent metal and a filler, it is usually dispersed through the entire bed of filler or through that portion of the bed comprising the desired ceramic composite body, in the form of particulates admixed with the filler, or perhaps as coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum first parent metal, the resulting oxidation reaction product is aluminum boride.

In some instances, the oxidation reaction of the first parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which exhibit low reactivity. An example of such a suitable inert filler is one which is identical to the intended oxidation reaction product.

If a liquid oxidant is employed in conjunction with the first parent metal and a filler, the entire bed of filler, or that portion comprising the desired ceramic body, is impregnated with the oxidant. The filler, for example, may be coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses.

As described in co-pending U.S. patent application Ser. No. 861,024 filed on May 8, 1986, and assigned to the same assignee, a barrier means may be used in conjunction with the filler material or preform to inhibit growth or development of the first oxidation reaction product beyond the barrier when vapor-phase oxidants are employed in the formation of a ceramic body with defined boundaries. Suitable barrier means may be a material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (plaster of Paris), calcium silicate, and Portland cement, and mixtures thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulate, desirably having a mesh size of about 20-1000, but may be still finer. Other suitable barriers include refractory ceramics or metal sheaths which are open on at least one end to permit a vapor-phase oxidant to permeate the bed and contact the molten parent metal.

The following non-limiting examples are provided to illustrate the method of this invention.

EXAMPLE 1

Ceramic materials containing interconnected porosity were prepared by the methods of the commonly owned patent applications. Thus, rectangular ingots each measuring 4 inches×9 inches×1½ inches were prepared from aluminum alloy 5052, containing nominally 2.4% magnesium and no more than 0.5% silicon and iron. Each ingot was embedded individually in aluminum oxide particles (Norton El Alundum of 90 mesh size) in a refractory crucible, and a 4 inch×9 inch face of the aluminum ingot was exposed substantially flush with the surface of the bed approximately ¼ inch below the crucible opening. A thin layer of 140 mesh $SiO_2$ particles was placed on the exposed metal surface as a dopant to promote the reaction.

The crucibles and their contents were placed into a furnace where they were heated in air to the set-point temperature of 1125° C. and held there 160 hours. This exposure time was designed to allow the parent Al metal to oxidize as completely as possible, thus creating an alpha-alumina ceramic with interconnected porosity. Cooling of the metal oxidation products occurred evenly over a 10-hour period.

Figure 6:
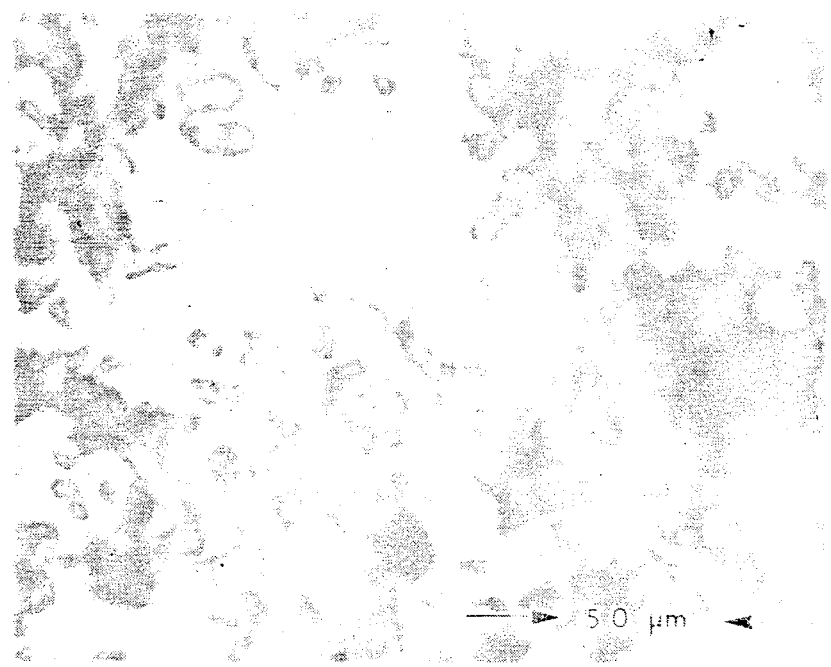
FIGS. 6–10 are photomicrographs at 400×magnification of cross sections of specimens prepared as described in Examples 1 and 2.

The highly porous nature of the ceramic oxidation product was confirmed by microscopic examination of a polished cross-section as exemplified by FIG. 6, an optical micrograph taken at 400×magnification, in which the gray material is alpha-aluminum oxide, the lighter material is either silicon (bright) or aluminum (mottled), and the dark areas are pores. The elemental (silicon or aluminum) content of the body was estimated to be approximately 3% by volume.

Reinfiltration of the resulting formed ceramic body with a grown oxidation reaction product was next demonstrated using two different parent aluminum alloys. For this purpose, rectangular pieces approximately 2 inches×¾ inch×½ inch were cut from the porous ceramic. The cut locations were selected to eliminate any spinel layer present on the original inner surface of the ceramic or any higher density layers on the external surface. These pieces were placed individually on top of rectangular ingots of aluminum alloy nominally measuring 2 inches×1 inch×½ inch with the 2×¾ inch ceramic and 2×2 inch metal faces adjacent.

Two different aluminum alloys were used: alloy 712.2 of nominal composition, 5.0-6.5% Zn, 0.05-0.65% Mg, 0.4-0.6% Cr, 0.4% Fe, 0.25% Cu, 0.15-0.25% Ti, 0.15% Si, and 0.1% Mn, and alloy 380.1 of nominal composition, 7.5-9.5% Si, 3.0-4.0% Cu, 2.97% Zn, 1.0% Fe, 0.5% Mn, 0.5% Ni, 0.35% Sn and 0.1% Mg. However the 380.1 alloy actually used in this work was found to contain about 0.17-0.18% Mg. The higher Mg level is believed to be important in view of the established role of Mg as a dopant or promoter of the oxidation reaction.

The ceramic/alloy assemblies described above were placed into separate refractory crucibles and surrounded with a layer of wollastonite particles approximately ½ inch thick. Wollastonite is used as a barrier material to contain the molten alloy and to confine the oxidation reaction to the void space of the ceramic bodies.

The crucibles and their contents were placed in a furnace and heated in the presence of air to the processing set-point temperature of 900° C. within a 5-hour heat-up period. The samples were maintained for 30 hours at the set-point temperature and then cooled to room temperature over a 5-hour period. The cooled ceramic pieces were then removed from the bedding and were observed to show no appreciable change in appearance or geometry.

Figure 7:
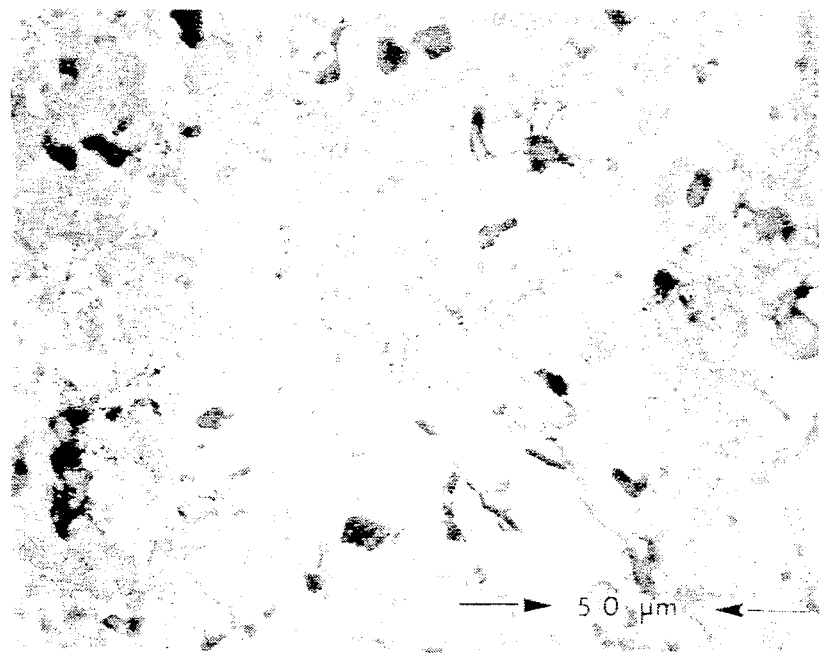
Figure 8:
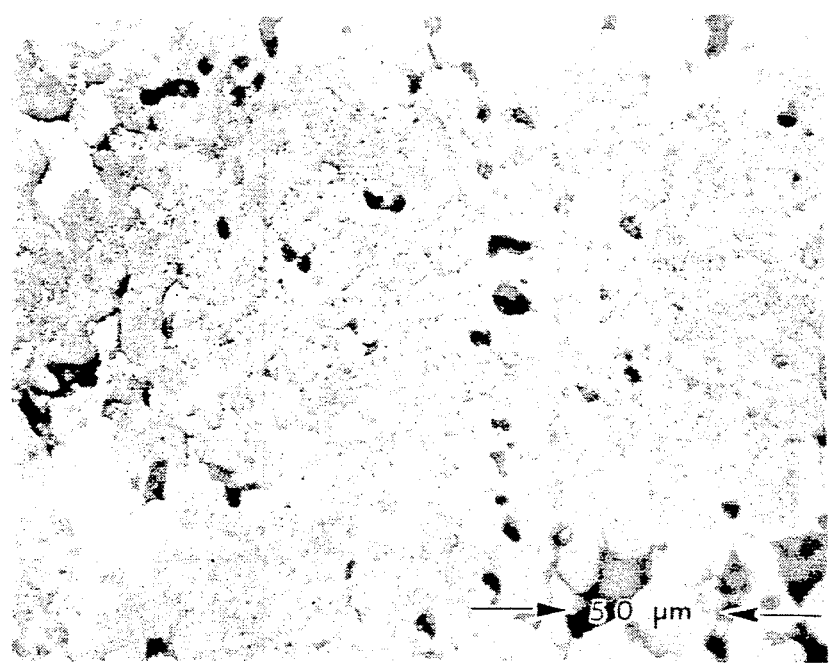

The ceramic pieces were cross-section, mounted, polished and observed optically for results of the reinfiltration experiment. This examination revealed good reinfiltration into the porous ceramic with both alloys 380.1 and 712.2. FIGS. 7 and 8 show the reinfiltrated product from alloys 380.1 and 712.2, respectively, at 400 times magnification. Note the interconnected ceramic reaction product replacing the interconnected porosity of the original ceramic (FIG. 6). The result is a much more dense body with what appears to be only isolated porosity remaining.

EXAMPLE 2

Figure 9:
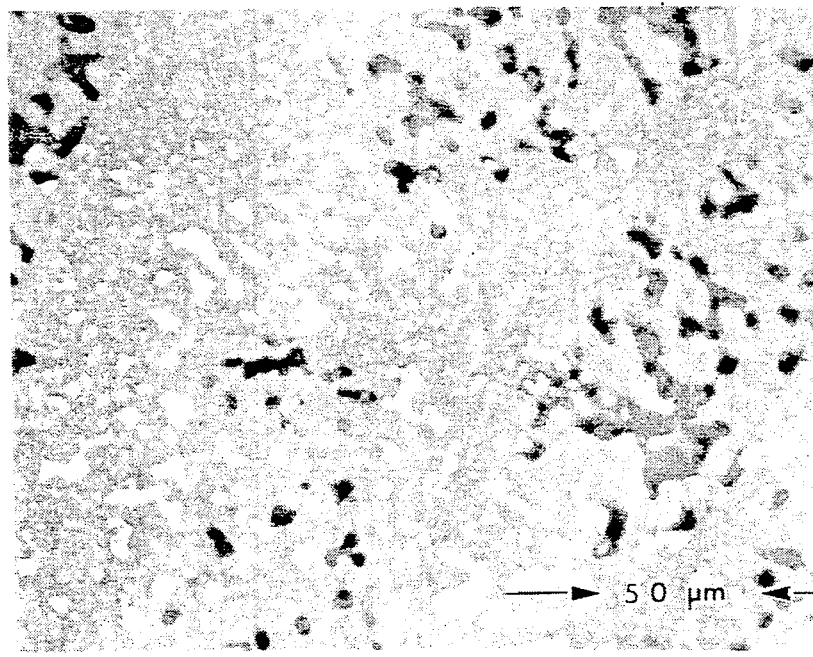

This example illustrates the reinfiltration of ceramic reaction product into a porous ceramic material prepared under different conditions than in Example 1. In this case the porous body was produced by oxidizing an alloy containing (by weight) 10% silicon, 3% magnesium, balance aluminum, at a reaction set-point temperature of 1250° C. for 80 hours. In all other aspects the preparation of initial porous ceramic was identical to that of Example 1. The microstructure of this material is shown in FIG. 9 at 400× magnification.

Figure 10:
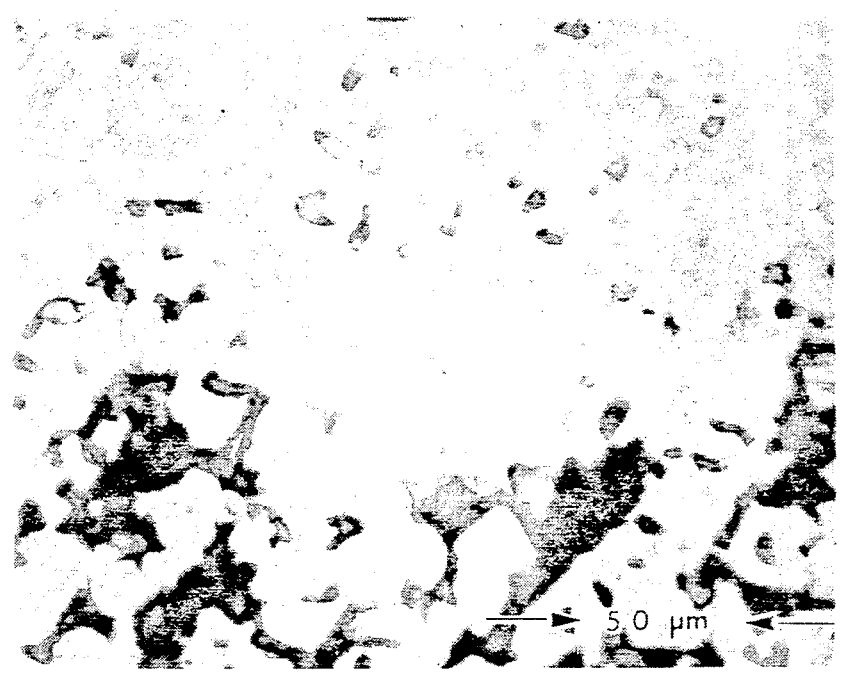

Reinfiltration of ceramic reaction product into the porous ceramic followed the procedure of Example 1 using the 712.2 alloy at 900° C. FIG. 10 shows a cross-section, also at 400× magnification, of the resulting material. It was found that infiltration had not been completed during the 30-hour period at 900° C. FIG. 10 shows the interface between the infiltrated and unaffected material (toward the left and right sides of the Figure, respectively). As in Example 1, the reinfiltrated material is found to have newly grown ceramic oxidation product filling the interconnected purity of the structure.

EXAMPLE 3

This example illustrates a gas-phase leaching technique for removing the interconnected metallic component of a ceramic body prior to the second oxidation reaction infiltration step of the present invention.

A ceramic body measuring about 2.018 inches by about 1.865 inches by about 0.468 inches produced by the methods of the commonly owned patent and patent applications and comprising an alumina matrix containing interconnected unoxidized parent metal constituents, was placed on top of a refractory boat comprised of 99.8% pure alumina. The assembly, consisting of the ceramic body and boat, was placed into a resistance heated tube furnace having a flowing atmosphere of HCl and $H_2$. The HCl gas was supplied to the furnace at 500 sccm (standard cubic centimeters per minute) and the $H_2$ was supplied at 20 sccm. The furnace ramp-up was about 300° C./hr and the ramp-down was about 500° C./hr. The sample was held at a temperature of about 375° C. for about 4 hours. Upon removal from the furnace, the sample was weighed and it was determined that the sample had lost about 19.84% of its pre-leached weight. In contrast to the weight loss experienced by the sample, the boat, which was made of the same material as the ceramic body except it did not contain interconnected metal, experienced negligible weight loss. Thus, the weight loss experienced by the ceramic body occurred primarily from the interconnected metal contained within the ceramic matrix, and not from the ceramic matrix itself.

Thus, by the utilization of a gaseous phase leachant, it is possible to remove the interconnected metal within a ceramic body and therefore provide porosity which can be infiltrated by a second oxidation reaction product in accordance with the present invention.

EXAMPLE 4

The technique described in Example 3 was repeated with two ceramic composite samples produced by the methods of the commonly owned patent applications and each comprising an alumina matrix which had infiltrated and embedded C75 unground alumina filler material produced by Alcan Company of Cleveland, Ohio. Each ceramic composite sample also contained an interconnected metallic component comprising unoxidized parent metal constituents.

The ceramic composite samples, each measuring about 1 cm by 1 cm by 1 cm, were placed on top of a bed of 24 grit 38 Alundum produced by Norton Co., of Wooster, Mass., all of which was contained within a refractory boat comprising 99.8% $Al_2O_3$. The assembly, consisting of the samples, bed and boat, was placed in a resistance heated tube furnace having a flowing atmosphere of HCl and $H_2$. The HCl gas was supplied to the furnace at 500 sccm (standard cubic centimeters per minute) and the $H_2$ was supplied at 20 sccm.

The furnace ramp-up and ramp-down rates were about 300° C./hr and the holding time was about 4 hrs at 1000° C. Upon removal from the furnace the samples were weighed and it was determined that each sample had lost about 11% of its pre-leached weight. This weight loss was attributable to loss of interconnected metal through gaseous-phase leaching.

Thus, by the utilization of a gaseous phase leachant it is possible to remove the interconnected metal within a ceramic composite body and therefore provide porosity which can be infiltrated by a second oxidation reaction product in accordance with the present invention.

EXAMPLE 5

This example illustrates a liquid-phase leaching technique for removing the interconnected metallic component of ceramic composite bodies prior to the second oxidation reaction infiltration step of the present invention.

Two ceramic composite bodies produced by the methods of the commonly owned patent and patent applications were exposed to liquid-phase leaching solutions in an attempt to remove interconnected metal contained within the bodies. Each ceramic composite body was comprised of an alumina matrix which had grown into and embedded a filler material. The first ceramic composite body, hereafter referred to as Sample 1, was comprised of an aluminum matrix, grown from a commercially available 712.2 aluminum alloy with air as the oxidant, embedding a filler material consisting of an admixture of 95% by weight 24 grit, 38 Alundum produced by Norton Co. of Wooster, Mass. and 5% by weight of a crushed sample of a ceramic body produced by the methods of the commonly owned patent and patent applications from a parent metal alloy comprising by weight 7.5–9.5% Si, 3.0–4.0% Cu, <2.9% Zn, <1.5% Fe, <0.5% Mn, <0.5% Ni, <0.35% Sn, and <0.18% Mg and containing no significant amount of interconnected metal.

The second ceramic composite body, hereafter referred to as Sample 2, was comprised of an alumina matrix, grown from a commercially available 380.1 aluminum alloy with air as the oxidant, embedding a filler material consisting of an admixture of 95% by weight 24 grit 38 Alundum produced by Norton Co. of Wooster, Mass. and 5% by weight of "Minusil" colloidal silica produced by U.S. Silica Company of Berkeley Spring, W. Va. The 380.1 alloy lot used to produce Sample 2 was determined through chemical analysis to be consistent with the nominal specification for this alloy (i.e., comprising 7.5–9.5% Si, 3.0–4.0% Cu, <2.9% Zn, <1.5% Fe, <0.5% Mn, <0.5% Ni, <0.35% Sn, and <0.1% Mg), except that the Mg concentration was found to be approximately 0.17% to 0.18% by weight. The higher Mg level is believed to be important in view of the established role of Mg as a dopant or a promoter of the oxidation reaction.

Both samples contained an interconnected metallic component comprising unoxidized constituents of their respective parent metals, i.e., 712.2 aluminum alloy for Sample 1 and 380.1 aluminum alloy for Sample 2.

Sample 1 was immersed in a boiling corrosive media consisting of about 50% by volume HCl, the balance being distilled $H_2O$.

Sample 2 was immersed in a boiling corrosive media consisting of about 50% by volume HCl and about 10% by volume $HNO_3$, the balance being distilled $H_2O$.

The compositions of the boiling corrosive media solutions were kept constant through the use of refluxes.

Samples 1 and 2 were removed from their respective corrosive medias at 24 hour intervals and weighed to determine the extent of the leaching. Table 1, presented below, shows that most leaching occurred in the first 24 hours and that by 96 hours, leaching was minimal.

TABLE 1

| Time Immersed | Weight (grams) | | Total Weight Loss (grams) | |
| --- | --- | --- | --- | --- |
| | Sample 1 | Sample 2 | Sample 1 | Sample 2 |
| 0 hrs | 8.5665 | 9.8360 | | |
| 24 hrs | 7.6504 | 8.7874 | 0.9161 | 1.0486 |
| 48 hrs | 7.3679 | 8.4696 | 1.1986 | 1.3664 |
| 72 hrs | 7.2093 | 8.4168 | 1.3572 | 1.4192 |
| 96 hrs | 7.2024 | 8.4132 | 1.3641 | 1.4228 |

The weight loss experienced by Sample 1 and Sample 2, as shown in Table 1, occurred primarily from the interconnected metal contained within the samples, rather than from the respective ceramic matrices of the samples. Thus, by the utilization of liquid phase leachants it is possible to remove the interconnected metal within a ceramic composite body and therefore provide porosity which can be infiltrated by a second oxidation reaction product in accordance with the present invention.

EXAMPLE 6

This example illustrates a liquid-phase leaching technique for removing the interconnected metallic component of a ceramic body prior to the second oxidation reaction step of the present invention.

The ceramic body used in this example was produced by the methods of the commonly owned patent applications and comprised an alumina matrix containing an interconnected metallic component. The alumina matrix was grown from a parent metal alloy comprising by weight 7.5-9.5% Si, 3.0-4.0% Cu, <2.9% Zn, <1.5% Fe, <0.5% Mn, <0.5% Ni, <0.35% Sn, and <0.18% Mg, the balance being aluminum. The interconnected metallic component was comprised of nonoxidized constituents of the parent metal alloy.

The ceramic body described above was immersed for about 100 hrs in a boiling solution of 1% by volume HCl, the balance being distilled $H_2O$.

Upon examination after removal from the leaching solution, the ceramic body showed significant leaching of the interconnected metallic component resulting in interconnected porosity.

Thus, by the utilization of a liquid phase leachant, it is possible to remove the interconnected metal within a ceramic body and therefore provide porosity which can be infiltrated by a second oxidation reaction product in accordance with the present invention.

EXAMPLE 7

This example illustrates a liquid phase leaching technique for removing the interconnected metal constituent of a ceramic body prior to the second oxidation reaction infiltration step of the present invention.

The same type of ceramic body described in Example 6 was immersed for about 25 hours in a boiling solution of 20% by volume NaOH, the balance being distilled $H_2O$.

Upon examination after removal from the leaching solution, the ceramic body showed significant leaching of the interconnected metal component resulting in interconnected porosity.

Thus, by utilization of a liquid phase leachant it is possible to remove the interconnected metal within a ceramic body and therefore provide porosity which can be infiltrated by a second oxidation reaction product in accordance with the present invention.

It should be noted that any liquid leachant solution or vapor-phase leachant can be used, so long as the leachant removes a sufficient amount of interconnected metal to create porosity in the body. Thus, since the interconnected metallic component is comprised of various metals, it may be necessary to use various leachants or mixtures of leachants in order to remove sufficient amounts of the interconnected metal to create porosity in the body. For example, while an HCl leachant in a liquid or gaseous form will substantially remove the aluminum constituent of the interconnected metallic component, it will not significantly remove the silicon constituent of the interconnected metallic component. However, an NaOH leachant in a liquid or gaseous form will substantially remove both the aluminum and silicon constituents of the interconnected metallic component of the ceramic or ceramic composite body being leached.

We claim:

1. A method of producing a self-supporting ceramic structure comprising the steps of:

(a) providing a first self-supporting ceramic body comprising (i) a first polycrystalline oxidation reaction product formed upon oxidation of a first molten parent metal with a first oxidant, and (ii) interconnected porosity at least partially accessible from at least one surface of said first ceramic body;

(b) orienting a body of second parent metal and said first ceramic body relative to each other so that melting and oxidation reaction of said second parent metal with a second oxidant will cause formation of a second polycrystalline oxidation reaction product in a direction towards and into said interconnected porosity of said first ceramic body, wherein at least one of said first and second oxidant comprises at least one oxidant selected from the group consisting of a liquid oxidant and a solid oxidant; and (c) heating said second parent metal to a temperature region above its melting point but below the melting points of both the first and second oxidation reaction products to form a body of molten second parent metal and, within said temperature region,
  (i) reacting said body of molten second parent metal with said second oxidant to form said second polycrystalline oxidation reaction product;
  (ii) maintaining at least a portion of said second oxidation reaction product in contact with and between said body of molten second parent metal and said second oxidant, whereby said second parent metal is drawn through said second polycrystalline material towards the oxidant so that said second oxidant reaction product continues to form at the interface between the second oxidant and previously formed second oxidation reaction product, and
  (iii) continuing said reaction for a time sufficient to infiltrate at least a portion of said porosity of said first ceramic body with said second oxidation reaction product.

2. A method for producing a self-supporting ceramic structure, comprising a polycrystalline material obtained as an oxidation reaction product of at least one parent metal with an oxidant, comprising the steps of (a) heating a first parent metal to form a body of first molten parent metal and reacting said first molten parent metal with a first oxidant at a temperature which is sufficient to form a first oxidation reaction product, and maintaining said first oxidation reaction product in contact with, and extending between, said body of first molten parent metal and said first oxidant, (b) maintaining said temperature to progressively draw molten metal through said first oxidation reaction towards said first oxidant so that the first oxidation reaction product continues to form at an interface between the first oxidant and previously formed first oxidation reaction product and (c) continuing said reaction for a time sufficient to produce a first self-supporting ceramic body comprising said first oxidation reaction product and at least one of porosity and at least one metallic constituent, said porosity being a result of at least one treatment step selected from the group consisting of (i) controlling the temperature at which the first oxidation reaction product is formed, (ii) controlling the length of time for formation of the first oxidation reaction product, (iii) varying composition of the first parent metal, (iv) combining dopant materials with the first parent metal, (v) subjecting the formed self-supporting body to a vaporizing atmosphere and (vi) subjecting the formed self-supporting body to a leachant; orienting a second parent metal and said first self-supporting ceramic body relative to each other so that formation of a second polycrystalline oxidation reaction product of the second parent metal with a second oxidant will occur in a direction towards and into the porosity of said first self-supporting ceramic body, wherein at least one of said first and second oxidant comprises at least one oxidant selected from the group consisting of a liquid oxidant and a solid oxidant; repeating process steps (a), (b) and (c) above on the second parent metal to form a second oxidation reaction product; and continuing the repeated reaction for a time sufficient so that said second oxidation reaction product infiltrates into at least a portion of said porosity of said first self-supporting ceramic body, thereby forming said ceramic structure.

3. The method of claim 1 or claim 2, wherein the infiltrating of said porosity of said first ceramic body occurs in a first zone thereof, and a second zone of said first ceramic body is substantially free from any infiltration of said second oxidation reaction product.

4. The method of claim 1, or claim 2, further comprising embedding a permeable mass of a filler material within at least one of said first and second oxidation reaction product.

5. The method of claim 4, wherein said permeable mass of filler material comprises a shaped preform, and said infiltration into said preform produces said first ceramic body as a ceramic composite body having a shape substantially corresponding to said preform.

6. The method of claim 1 or claim 2, wherein said oxidant utilized for oxidizing said first parent metal differs from the oxidant utilized for oxidizing said second parent metal.

7. The method of claim 1, wherein the first and second parent metals comprise at least one member selected from the group consisting of aluminum, silicon, titanium, tin, zirconium, and hafnium.

8. The method of claim 1, or claim 2, wherein said first parent metal and said second parent metal each comprise an aluminum parent metal.

9. The method of claim 1 or claim 2, further comprising utilizing a dopant material in conjunction with at least one of said first parent metal and said second parent metal.

10. The method of claim 1 or claim 2, wherein both of the first and second parent metals comprise aluminum and both of the first and second polycrystalline oxidation reaction products comprise alumina.

11. The method of claim 1 or claim 2, wherein the porosity of the first ceramic body comprises between about 5 to 45 percent by volume of the first ceramic body before infiltration of the porosity in the first ceramic body by said second oxidation reaction product.

12. The method of claim 2, wherein said first ceramic body comprises at least one interconnected metallic constituent which is at least partially accessible from at least one surface of said first ceramic body, and wherein said first ceramic body is contacted by said leachant prior to infiltration of said porosity by said second oxidation reaction product in order to at least partially remove said at least one interconnected metallic constituent from said first ceramic body.

13. The method of claim 1, or claim 2, wherein said first parent metal and said second parent metal differ in composition from each other.

14. The method of claim 1, or claim 2, wherein said first parent metal and said second parent metal differ in composition from each other.

15. The method of claim 1 or claim 2, wherein said first ceramic body comprises at least one interconnected metallic constituent which is at least partially accessible from at least one surface of said first ceramic body, and wherein said first ceramic body is subjected to an elevated temperature to result in said at least one metallic constituent being substantially removed from the first ceramic body prior to infiltration of the porosity in the first ceramic body by said second oxidation reaction product.

16. The method of claim 1, further comprising contacting said first oxidation reaction product with a leachant before said orienting step.

17. The method of claim 2 or claim 16, wherein said leachant comprises at least one material selected from the group consisting of HCl, $H_2$, NaOH, and KOH.

18. The method of claim 2 or claim 16, wherein said leachant comprises a gas phase mixture of $H_2$ and HCl.

19. The method of claim 18, wherein said gas phase mixture comprising $H_2$ and HCl is at a temperature from about 375° through about 1000° C.

20. The method of claim 1, or claim 2, wherein at least one filler material is disposed within at least a portion of said interconnected porosity of said first ceramic body before growth of said second oxidation reaction product into said porosity, to permit said second oxidation reaction product to infiltrate and embed said filler material within the interconnected porosity to form a ceramic composite structure within said interconnected porosity of said first ceramic body.

21. The method of claim 20, wherein said first ceramic body comprises a ceramic composite body formed by infiltrating and embedding at least one filler material with said first polycrystalline oxidation reaction product.

* * * * *